United States Patent
Miyata

(10) Patent No.: US 6,295,162 B1
(45) Date of Patent: *Sep. 25, 2001

(54) REAR PROJECTION SCREEN WITH OPTICAL SHEET HAVING IRREGULARITIES CAUSED BY DIFFUSING MATERIAL SMOOTHED WITH A TRANSPARENT CONTROL LAYER

(75) Inventor: Hideki Miyata, Shinjuku-Ku (JP)

(73) Assignee: Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,292

(22) PCT Filed: Jan. 20, 1998

(86) PCT No.: PCT/JP98/00193

§ 371 Date: Aug. 14, 1998

§ 102(e) Date: Aug. 14, 1998

(87) PCT Pub. No.: WO98/32049

PCT Pub. Date: Jul. 23, 1998

(30) Foreign Application Priority Data

Jan. 20, 1997 (JP) .................................................. 9-007234

(51) Int. Cl.[7] .................................................. G03B 21/60
(52) U.S. Cl. .............................................................. 359/453
(58) Field of Search .................................. 359/453, 455, 359/456, 460; 362/317, 351, 355

(56) References Cited

U.S. PATENT DOCUMENTS

| | | | |
|---|---|---|---|
| 3,682,530 | * 8/1972 | De Palma et al. | 350/126 |
| 3,779,630 | 12/1973 | Clausen et al. | 350/117 |
| 4,387,959 | * 6/1983 | Lange et al. | 350/128 |
| 4,401,368 | * 8/1983 | Dreschel et al. | 350/126 |
| 4,537,474 | * 8/1985 | Asterö | 350/432 |
| 4,666,248 | * 5/1987 | van de Ven | 350/128 |
| 5,426,531 | * 6/1995 | Tsukagoshi | 359/457 |
| 5,434,706 | * 7/1995 | Mitani et al. | 359/457 |
| 5,513,036 | * 4/1996 | Watanabe et al. | 359/457 |
| 5,661,600 | * 8/1997 | Mitani et al. | 359/457 |
| 5,724,182 | * 3/1998 | Mitani et al. | 359/457 |
| 5,745,288 | * 4/1998 | Miyata et al. | 359/457 |
| 5,837,346 | * 11/1998 | Langille et al. | 428/141 |
| 6,038,070 | * 3/2000 | Hori | 359/456 |

FOREIGN PATENT DOCUMENTS

| | | |
|---|---|---|
| 5-265095 | 10/1993 | (JP) . |
| 5-289176 | 11/1993 | (JP) . |
| 6-160982 | 6/1994 | (JP) . |
| 6-266009 | 9/1994 | (JP) . |
| 8-258051 | 10/1996 | (JP) . |
| 8-320407 | 12/1996 | (JP) . |

\* cited by examiner

Primary Examiner—Christopher E. Mahoney
(74) Attorney, Agent, or Firm—Parkhurst & Wendel, L.L.P

(57) ABSTRACT

A rear projection screen including a lenticular lens sheet with lenticular lenses for condensing or diffusing light and a transparent smooth layer having a surface roughness of 0 to 40 micrometers placed on the surface of the light-emerging side of the lenticular lens sheet. The rear projection screen can give an image that (1) is free from roughening, (2) has high fidelity gloss reproduction, and (3) has excellent contrast and sharpness.

14 Claims, 3 Drawing Sheets

REAR PROJECTION SCREEN WITH OPTICAL SHEET HAVING IRREGULARITIES CAUSED BY DIFFUSING MATERIAL SMOOTHED WITH A TRANSPARENT CONTROL LAYER

TECHNICAL FIELD

The present invention relates to rear projection screens chiefly used for rear-projection-type projectors such as video projectors and slide projectors.

BACKGROUND ART

As rear projection screens of this type, there have conventionally been known those screens composed of a single lenticular lens sheet comprising as a base material a synthetic resin such as polymethyl methacrylate, and an inorganic material such as glass or aluminum hydroxide, or beads of an organic material such as polymethyl methacrylate or polystyrene, incorporated into the base material, and those screens composed of such a lenticular lens sheet and other lens sheets. In the case of these rear projection screens, imaging light is projected on the screens by using a light source such as a CRT.

In addition to CRTs, single-tube light sources such as LCDs, DMDs and ILAs have recent y been used as the light sources for projection. Further, images projected are also becoming very clear and distinct, like those images formed on high-definition televisions or the like.

DISCLOSURE OF THE INVENTION

As in the case of the conventional broadcasting systems such as the NTSC and PAL color television systems, the aforementioned conventional rear projection screens have such a problem that, especially when very clear and distinct images are projected on the screens, the displayed images undergo roughening. Specifically, the surfaces of the screens look as if they are covered with a very fine net, so that the images displayed on the screens are seem to be deteriorated. It is known that this problem becomes more serious when single-tube light sources are used for the formation of the images.

Further, the conventional rear projection screens cannot so well reproduce the gloss of metals, etc. as direct-view tubes. Moreover, the images displayed on the screens have low contrast; and they are observed to be whitish and to be insufficient in sharpness especially under strong extraneous light.

Furthermore, it has also been known that the surfaces of the conventional rear projection screens readily receive fine scratches and that -the above-described problems become more serious due to these scratches.

The present invention was accomplished in view of the aforementioned facts. An object of the present invention is therefore to provide a rear projection screen capable of providing an image which is free from roughening, which has gloss reproduced with high fidelity and which is excellent in contrast and sharpness.

Another object of the present invention is to provide a rear projection screen whose surface does not receive fine scratches which will be the cause of the deterioration of an image displayed on the screen.

The first feature of the present invention is a rear projection screen comprising a lens sheet or flat sheet having such an optical function as light-condensing or light-diffusing function, wherein at least a surface of an imaging-light-transmitting area in the light-emerging-side surface of the lens sheet or flat sheet is made smooth so that a surface roughness of the imaging-light-transmitting area will be from 0 to 0.40 micrometers.

In the first feature of the present invention, it is preferable that the surface of the imaging-light-transmitting area be made smooth by coating thereto a transparent material. Further, it is preferable that the surface of the imaging-light-transmitting area be made smooth by coating thereto a transparent material whose refractive index is lower than that of a base material of the lens sheet or flat sheet. Furthermore, it is preferable that the surface of the imaging-light-transmitting area be coated with a layer of the transparent material having a thickness d which can fulfill the equation $d = \lambda/4n$, where n is a refractive index of the transparent material, d is a thickness, and $\lambda$ is a theoretical design wavelength. It is also preferable that the surface of the imaging-light-transmitting area be made smooth by coating thereto a transparent material whose hardness is higher than that of a base material of the lens sheet or flat sheet. In addition, it is preferable that a light-shielding layer be provided on the light-emerging-side surface of the lens sheet or flat sheet, excluding the surface of the imaging-light-transmitting area and that the light-shielding layer be coated with a transparent material.

The second feature of the present invention is a rear projection screen comprising a plurality of lens sheets or flat sheets having such an optical function as light-condensing or light-diffusing function, wherein at least a surface of an imaging-light-transmitting area in a light-emerging-side surface of at least the outermost sheet on an observation side of the lens sheets or flat sheets is made smooth.

According to the first and second features of the present invention, at least the surface of the imaging-light-transmitting area in the light-emerging-side surface of the lens sheet or flat sheet is made smooth. Therefore, the screen can provide an image that is free from roughening, which has gloss reproduced with high fidelity and which is excellent in contrast and sharpness. Further, the surface of the imaging-light-transmitting area is made smooth by coating thereto a transparent material whose hardness is higher than that of the base material of the lens sheet or flat sheet. Therefore, the image displayed on the screen is free from deterioration which is brought about by fine scratches formed on the screen.

BEST MODE FOR CARRYING OUT THE INVENTION

First Embodiment

Figure 1B:
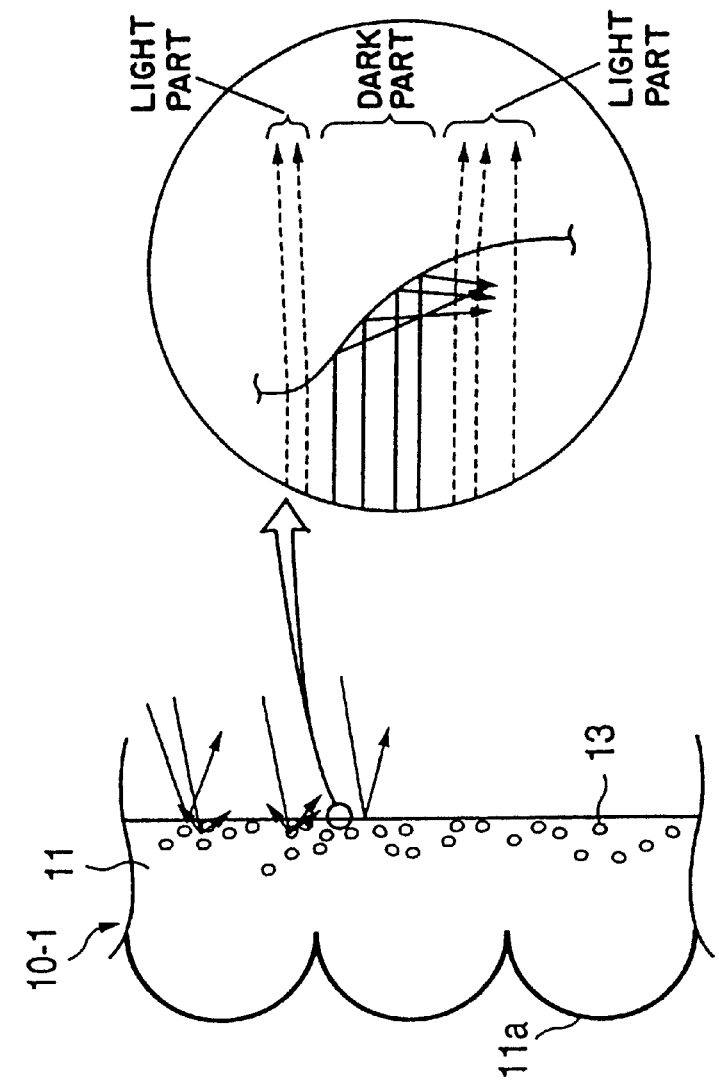
FIG. 1B is an illustration showing a conventional rear projection screen.
Figure 1A:
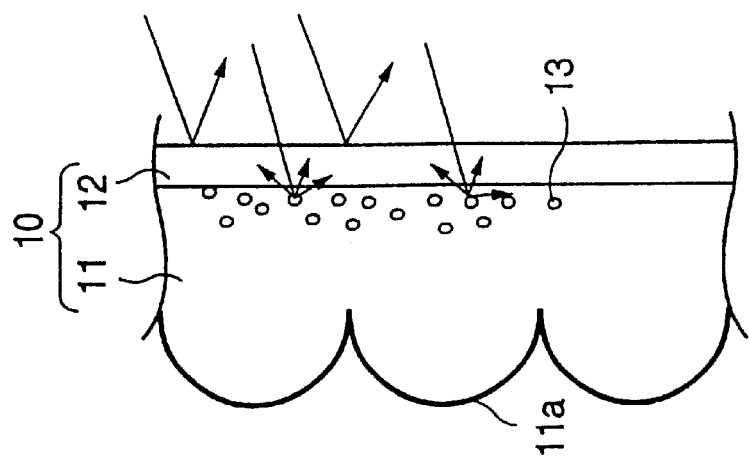
FIG. 1A is an illustration showing a first embodiment of the rear projection screen according to the present invention.

By referring to the accompanying drawings, embodiments of the present invention will now be explained in detail. FIG. 1A is an illustration showing a first embodiment of the rear projection screen according to the present invention.

As shown in FIG. 1A, a rear projection screen 10 comprises a lenticular lens sheet 11 in which lenticular lenses 11a are provided on the light source side thereof and in which a diffusing material 13 is dispersed, and a transparent smooth layer 12 provided on the lenticular lens sheet 11 on the observation side thereof.

Now an explanation of a conventional rear projection screen will be given for comparison. As shown in FIG. 1B, a conventional rear projection screen 10-1 employs a lenticular lens sheet 11 in which lenticular lenses 11a are provided on the light source side and in which a diffusing material 13 is dispersed.

In such a rear projection screen 10-1, when fine irregularities are present on the surface of the light-emerging area in the outermost sheet on the observation side of the lens sheets or flat sheets having such an optical function as light-condensing or light-diffusing function (such a sheet being the lenticular lens sheet 11 in the case of the rear projection screen 10-1 composed of a single lenticular lens sheet as shown in FIG. 1B), a part of imaging light causes total reflection at the light-emerging area, and a part from where the imaging light does not emerge becomes dark (see a partially enlarged view of FIG. 1B). The darkened part is observed as a black dot on the screen. As a result, the roughening of image is brought about as mentioned previously.

When an image to be projected on the rear projection screen 10-1 is very clear and distinct, the black dot formed on the screen becomes as large as the picture element. When the black dot becomes larger than the picture element, such a state is caused that one picture element is completely missing, and the black dot is thus often recognized as a defect.

Further, in the case of a light source such as a CRT, composed of three tubes, even if incident light from one direction causes total reflection, incident light from the other two directions emerges. On the other hand, in the case of a light source such as an LCD, composed of a single tube, imaging light enters only from one direction. Therefore, if this incident light causes total reflection, imaging light does not emerge at all, and, as a result, a black dot formed on the screen is observed very clearly.

Furthermore, when the light-emerging area on the lens sheet or flat sheet is insufficient in smoothness, extraneous light scatters at this area. This makes the displayed image whitish, and, as a result, the image loses its gloss and sharpness.

In the rear projection screen 10 shown in FIG. 1A, the transparent smooth layer 12 is provided on the lenticular lens sheet 11 on the observation side thereof to smooth the light-emerging-side surface of the lenticular lens sheet 11, thereby solving the above-described problems such as the roughening of image.

In the conventional rear projection screen 10-1 shown in FIG. 1B, the light-emerging surface of the lenticular lens sheet 11 is poor in smoothness because those fine irregularities formed when the lenticular lens sheet is made by molding are remaining, and, in addition, the diffusing material 13 is existing very near the light-emerging surface. Therefore, scattering reflection and mirror reflection are caused at almost the same position in the vicinity of the light-emerging surface of the lenticular lens sheet 11. In contrast to this, in the rear projection screen 10 shown in FIG. 1A, scattering reflection is caused in the vicinity of the light-emerging surface of the lenticular lens sheet 11, while mirror reflection is caused on the light-emerging surface of the transparent smooth layer 12. Namely, scattering reflection and mirror reflection are caused at different positions, so that the mirror-reflected components become striking. The image can thus acquire gloss and clearness.

Evaluation was carried out by using some sample screens containing lenticular lens sheets 11 whose light-emerging-side surfaces have different surface roughnesses Ra (the center line average height of fine irregularities, determined by using a contact-type measuring apparatus). As a result, it was found that, the roughening of image is drastically mitigated when the surface roughness Ra becomes 0.40 micrometers or less.

In the present invention, it is preferable that the transparent smooth layer 12 be formed by coating a transparent resin (transparent material) onto the light-emerging surface of the lenticular lens sheet 11.

In general, the light-emerging surface of a screen sheet such as a lens sheet can be made into a mirror surface by a molding method capable of attaining high transferability, such as an injection, press, or cast molding method, using a metal mold having no irregularities on an area corresponding to the light-emerging surface. However, in such a molding method capable of attaining high transferability, if fine roughness is present on the surface of the metal mold, this roughness is fully reproduced on the surface of the resulting molded product. It is therefore necessary to make the metal mold with scrupulous care so that it will not have fine roughness.

As a conventional molding method for making screen sheets, an extrusion molding method can be mentioned in addition to the above-described molding methods. Although high productivity can be attained by 1his molding method, the transferability attained by a metal mold used is low, and the light-emerging surface tends to be considerably roughened.

Thus, it is, in general, quite difficult to make the light-emerging surface of a screen sheet by means of molding. In contrast to this, in the rear projection screen 10 shown in FIG. 1A, the transparent smooth layer 12 is provided by coating a transparent resin onto the light-emerging surface of the lenticular lens sheet 11. Therefore, the light-emerging-side surface of the lenticular lens sheet 11 can easily be made smooth.

In the rear projection screen 10 shown in FIG. 1A, the transparent smooth layer 12 is entirely provided on the light-emerging surface of the lenticular lens sheet 11. Therefore, as compared with a case where a smooth layer is provided only on the light-emerging area (imaging-light-transmitting area), the image displayed on the screen can be prevented well from being roughened, and from becoming whitish which is caused by the irregular reflection of extraneous light. Further, since mirror reflection is made striking by the transparent smooth layer 12 with which the light-emerging surface of the lenticular lens sheet 11 is entirely covered, an image having improved gloss can be obtained.

It is preferable that the transparent smooth layer 12 be formed by using a transparent material (low-refractive-index material) having a refractive index lower than that of the base material of the lenticular lens sheet 11. By doing so, it is possible to prevent the roughening of image, and to impart gloss to the image displayed. In addition, the reflection of light at the light-emerging surface is decreased, so that an image having improved contrast and sharpness can be obtained.

It is preferable to adjust the thickness d of the transparent smooth layer 12 so that it can fulfill the equation $d=\lambda/4n$, where n is the refractive index of the low-refractive-index material, d is the thickness, and X is the theoretical design wavelength. By doing so, the reflection of extraneous light becomes minimum, and an image which is very excellent in contrast and sharpness can thus be obtained.

It is also possible to form a plurality of low-reflective layers on the light-emerging surface of the lenticular lens sheet 11 by providing some layers having different refractive index between the low-refractive-index transparent smooth layer 12 and the lenticular lens sheet 11.

Further, in the rear projection screen 10 shown in FIG. 1A, it is preferable to smooth the light-emerging surface of the lenticular lens sheet 11 by coating thereto a transparent resin whose hardness is higher than that of the base material of the lenticular lens sheet 11. By doing so, the light-emerging surface can acquire high surface hardness. Therefore, even if the light-emerging surface comes into contact with foreign matter, it is not scratched, and the roughening of the surface which will newly raise the problem of roughening of image, and the like is not caused.

In the above-described first embodiment of the present invention, the light-emerging-side surface of the lenticular lens sheet 11 is made smooth by providing thereon the transparent smooth layer 12 by using a transparent resin. However, the light-emerging surface of the lenticular lens sheet 11 may also be made smooth, instead of by coating a transparent resin, by producing the lenticular lens sheet 11 by a molding method capable of attaining high transferability, such as an injection, press or cast molding method.

Further, in the above-described first embodiment of the present invention, an explanation has been given to the rear projection screen 10 comprising the lenticular lens sheet 11 which is composed of a single sheet. However, the explanation can also be applied to a rear projection screen comprising a plurality of lens sheets or flat sheets having such an optical function as light-condensing or light-diffusing function. In this case, it is preferable that at least the light-emerging-side surface of the outermost sheet on the observation side of the lenticular lens sheets or flat sheets be made smooth by means of coating, or by producing the sheet by a molding method capable of attaining high transferability.

Second Embodiment

FIGS. 2A to 2D are illustrations showing a second embodiment of the rear projection screen according to the present invention.

Figure 2D:
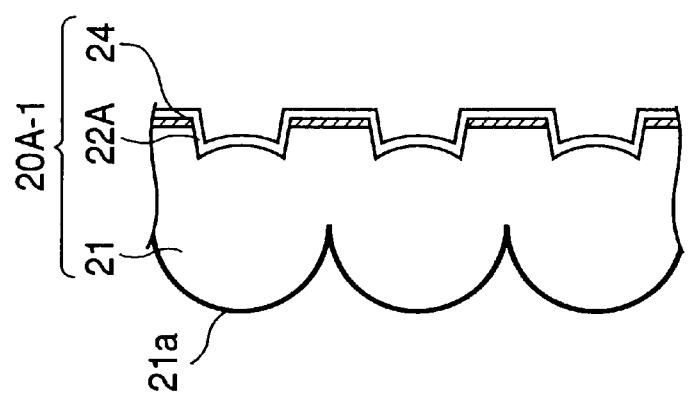
FIGS. 2A to 2D are illustrations showing a second embodiment of the rear projection screen according to the present invention.
Figure 2C:
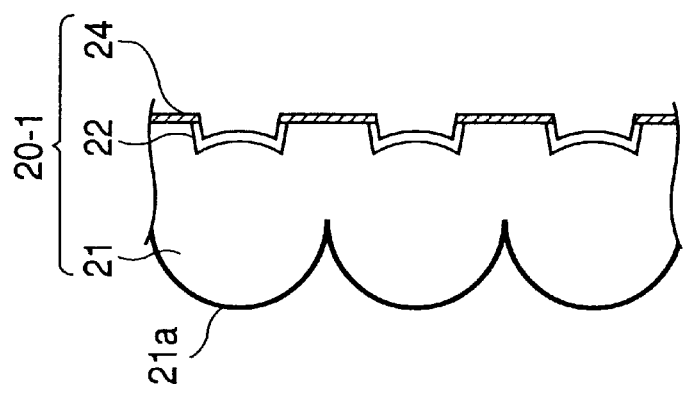
Figure 2B:
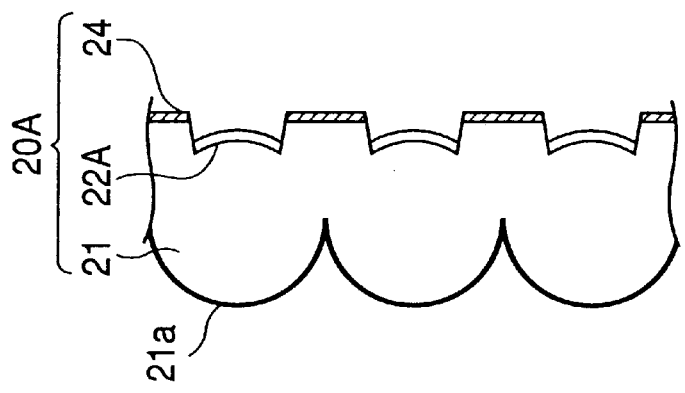
Figure 2A:
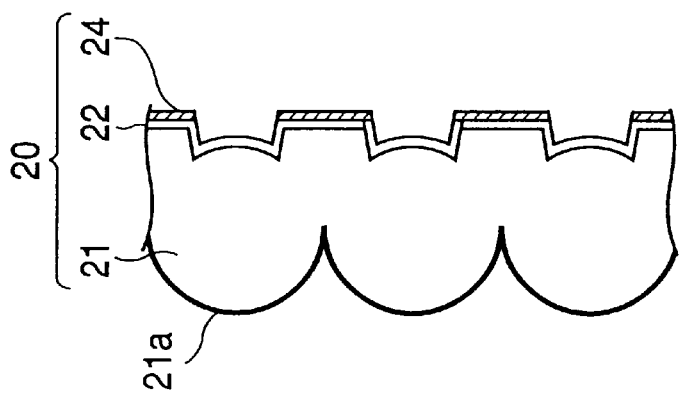

As shown in FIG. 2A, a rear projection screen 20 comprises a lenticular lens sheet 21 in which lenticular lenses 21a are provided on the light source side, a transparent smooth layer 22 entirely provided on the observation-side surface of the lenticular lens sheet 21, and a light-shielding layer (black stripes) 24 provided on the non-light-emerging parts of the lenticular lenses 21a (the top of the protrusions).

In this rear projection screen 20, the light-shielding layer 24 is provided on a part of the light-emerging-side surface of the lenticular lens sheet 21. This embodiment can therefore drastically improve the contrast as compared with the aforementioned first embodiment. Further, since the light-emerging area (imaging-light-transmitting area) on the lenticular lens sheet 21 is made smooth by the transparent smooth layer 22, the roughening of image can be prevented well as in the aforementioned first embodiment.

FIGS. 2B, 2C and 2D are illustrations showing variations of the rear projection screen 20 shown in FIG. 2A.

As shown in FIG. 2B, in a rear projection screen 20A, a light-shielding layer 24 is provided on the non-light-emerging parts, and a transparent smooth layer 22A is provided only on the lenticular lens surfaces on the light-emerging side, which are the main light-emerging parts of the lenticular lenses 21a.

Further, as shown in FIG. 2C, in a rear projection screen 20-1, a light-shielding layer 24 is provided on the non-light-emerging parts, and a transparent smooth layer 24 is provided on the light-emerging parts.

Furthermore, as shown in FIG. 2D, in a rear projection 15 screen 20A-1, a light-shielding layer 24 is provided on the non-light-emerging parts of lenticular lenses 21a; and, after the light-shielding layer 24 is provided, a transparent smooth layer 22A is entirely provided on the observation-side surface so as to also cover the light-shielding layer 24.

In all of the rear projection screens shown in FIGS. 2A to 2D, the light-emerging-side lenticular lens surfaces, main light-emerging parts, are made smooth. Therefore, not only the roughening of image but also scattering reflection at the light-emerging parts can be prevented.

Further, the rear projection screens shown in FIGS. 2A, 2C and 2D are different from the rear projection screen shown in FIG. 2B in that even those parts other than the light-emerging-side lenticular lens surfaces, main light-emerging parts, are made smooth. Intrinsically, imaging light does not emerge from these parts.

However, it actually emerges from the parts very slightly due to the diffusing material contained in the lenticular lens sheet. The light emerged from these parts make a large exit angle with a normal line, so that no effect seems to be brought about when the image is viewed from the front. However, when the image is observed obliquely, it can be recognized that the roughening of image is effectively prevented.

There is no difference in performance between the screen shown in FIG. 2A and that shown in FIG. 2C. The structure as shown in FIG. 2C can be obtained by forming the transparent smooth layer 22 with masking the non-light-emerging parts (the top of the protrusions), releasing the masking film, and providing the light-shielding layer 24 on the parts from which the masking film has been released.

The screen shown in FIG. 2D is different from those shown in FIGS. 2A to 2C in that the transparent smooth layer 22A is provided also on the light-shielding layer 24. Although most of imaging light is absorbed by the light-shielding layer 24, a little imaging light is reflected. This reflected light makes the displayed image whitish. By providing the transparent smooth layer 22A on the light-shielding layer 24, it is possible to prevent scattering reflection which is caused due to the surface roughness of the light-shielding layer 24. Therefore, the image can further be prevented from becoming whitish.

Third Embodiment

Figure 3:
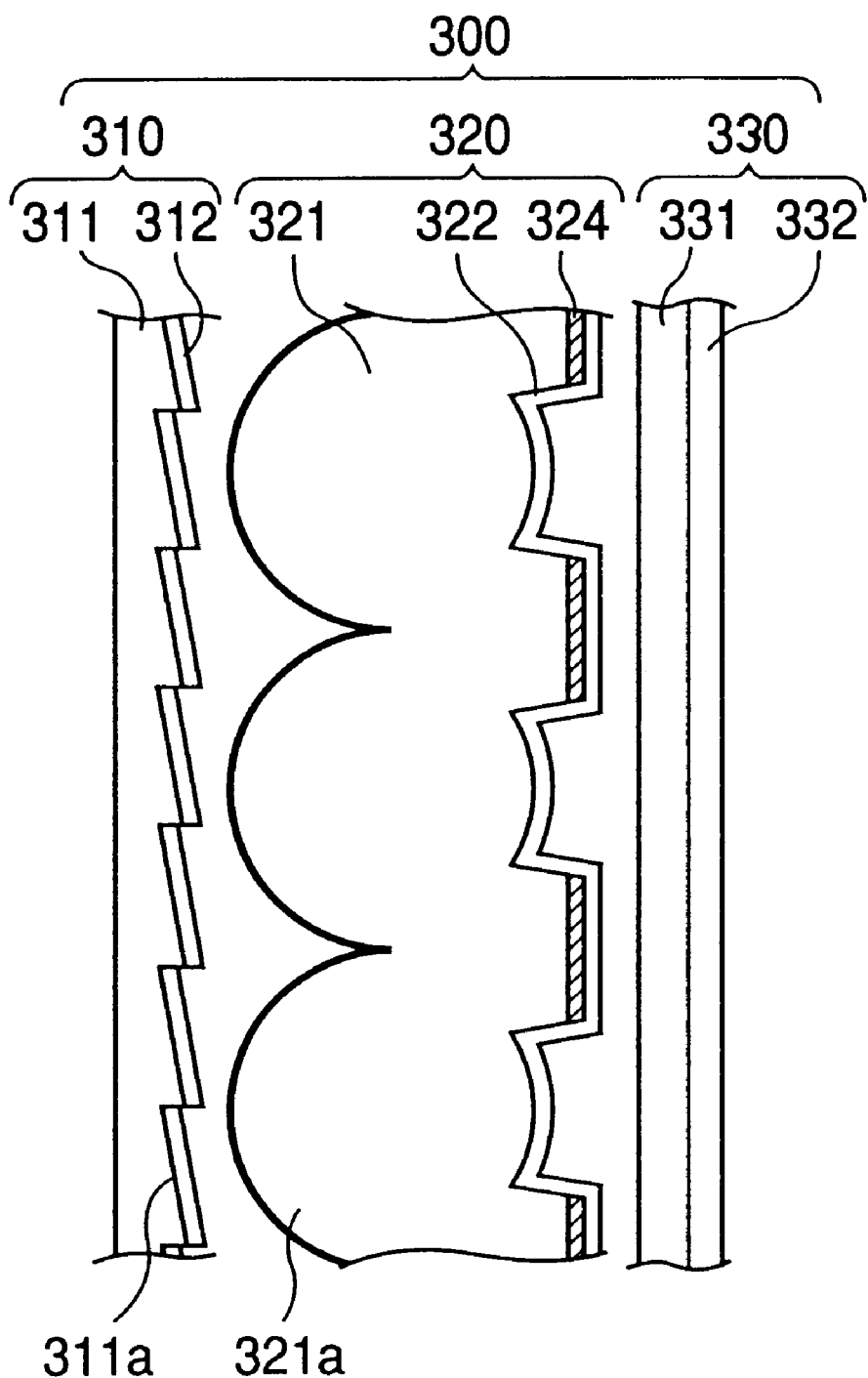
FIG. 3 is an illustration showing a third embodiment of the rear projection screen according to the present invention.

FIG. 3 is an illustration showing a third embodiment of the rear projection screen according to the present invention.

As shown in FIG. 3, a rear projection screen 300 is a combination of a Fresnel lens sheet 310, a lenticular lens sheet 320, and a flat sheet 330.

In the Fresnel lens sheet 310, a Fresnel lens 311a is provided on the light-emerging-side surface thereof, and a transparent smooth layer 312 is formed on the light-emerging area (imaging-light-transmitting area) on the Fresnel lens 311a. Further, the lenticular lens sheet 320 has lenticular lenses 321a provided on the light source side thereof. A light-shielding layer 324 is provided on the non-light-emerging parts (the top of the protrusions) of the lenticular lenses 321a, and a transparent smooth layer 322 is formed on the light-emerging parts of the lenticular lens sheet 321 on the observation side thereof and on the light-shielding layer 324. The flat sheet 330 contains a plane flat sheet 331 whose light-emerging-side surface is covered with a transparent smooth layer 332.

The roughening of image, and the like are most strongly affected by total reflection caused by fine irregularities on the outermost lens sheet or flat sheet on the observation side of the rear projection screen. However, also in the case where imaging light emerges from a lens sheet or the like other than the outermost lens sheet or the like on the observation side, black dots are produced by total reflection. These black dots become unclear because light scatters when it passes through a lens sheet or the like positioned on the light-emerging side as compared with the outermost lens sheet or the like on the observation side. However, they never disappear completely. The remaining black dots are observed on the screen as the roughness of the image.

According to the third embodiment of the present invention, the transparent smooth layers 312, 322 and 332 are provided on all of the light-emerging surfaces of the lens sheets 310 and 320 and the flat sheet 330 which constitute the rear projection screen 300. It is therefore possible to prevent the appearance of black dots not only on the flat sheet 330 which is the outermost sheet on the observation side, but also on the lens sheets 310 and 320. The roughening of the finally observed image can thus be prevented more effectively.

EXAMPLES

Example 1

Specific examples of the above-described rear projection screens will now be given below. All of the following Examples correspond to the above-described first embodiment, and are concerned with rear projection screens comprising two lens sheets, that is, a Fresnel lens sheet and a lenticular lens sheet, where the Fresnel lens sheet is positioned on the light source side, and the lenticular lens sheet is positioned on the observation side.

Example 1 is concerned with a rear projection screen of the above-described first embodiment, in which both of the lens sheets on the light source side and on the observation side are made smooth without providing thereon coatings.

Namely, in Example 1, a rear projection screen was made by the combination use of a Fresnel lens sheet (surface roughness Ra=0.20 micrometers) having a thickness of 2 mm, produced by means of press molding, and a lenticular lens sheet (lens pitch 0.50 mm, surface roughness Ra=0.38 micrometers) having a thickness of 1.5 mm, produced by means of cast molding. The Fresnel lens sheet was made from an anti-shock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers. The lenticular lens sheet was made from an anti-shock type polymethyl methacrylate resin (manufactured by Sumitomo Chemical Co., Ltd., refractive index n=1.51) containing 1.3 parts by weight of glass beads having a refractive index n of 1.53, and a mean particle diameter of 15 micrometers. It is noted that the amount of a diffusing material such as styrene beads or glass beads, shown in this specification is based on 100 parts by weight of a polymethyl methacrylate resin (base material) in which the diffusing material is dispersed.

An image was projected on the thus-produced rear projection screen by using an LCD projector, and evaluated. As a result, the image was observed to be free from roughening, to have gloss, and to be excellent in contrast and sharpness.

Example 2

Example 2 is concerned with a rear projection screen of the above-described first embodiment, in which both of the lens sheets on the light source side and on the observation side are made smooth (the lens sheet on the light source side being made smooth without providing thereon a coating, and the lens sheet on the observation side being made smooth by providing thereon a coating).

Namely, in Example 2, a rear projection screen was made by the combination use of a Fresnel lens sheet (surface roughness Ra=0.21 micrometers) having a thickness of 2 mm, produced by means of press molding, and a lenticular lens sheet (lens pitch 0.75 mm) having a thickness of 1 mm, produced by means of extrusion molding. The Fresnel lens sheet was made from an anti-shock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers. The lenticular lens sheet was made from an anti-shock type polymethyl methacrylate resin (manufactured by Sumitomo Chemical Co., Ltd., refractive index n=1.51) containing 2.0 parts by weight of glass beads having a refractive index n of 1.53, and a mean particle diameter of 13 micrometers, and the surface of the lenticular lens sheet obtained was made smooth by coating thereto an acrylic transparent resin (surface roughness Ra=0.35 micrometers).

An image was projected on the thus-produced rear projection screen by using an LCD projector, and evaluated. As a result, the image was observed to be free from roughening, to be very excellent in gloss, and to have high contrast and sharpness.

Example 3

Example 3 is concerned with a rear projection screen of the above-described first embodiment, in which only the lens sheet on the observation side is made smooth by means of coating.

Namely, in Example 3, a rear projection screen was made by the combination use of a Fresnel lens sheet (surface roughness Ra=0.43 micrometers) having a thickness of 2 mm, produced by a press molding method, using a metal mold whose surface had been roughened (surface roughness Ra=0.45 micrometers) by a blast treatment so as to obtain a Fresnel lens surface, and a lenticular lens sheet (lens pitch 0.75 mm) having a thickness of 1 mm, produced by means of extrusion molding. The Fresnel lens sheet was made from an anti-shock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers. The lenticular lens sheet was made from an anti-shock type polymethyl methacrylate resin (manufactured by Sumitomo Chemical Co., Ltd., refractive index n=1.51) containing 2.0 parts by weight of glass beads having a refractive index n of 1.53, and a mean particle diameter of 13 micrometers, and the surface of the lenticular lens sheet obtained was made smooth by coating thereto an acrylic transparent resin (surface roughness Ra=0.35 micrometers).

An image was projected on the thus-produced rear projection screen by using an LCD projector, and evaluated. As a result, the image was observed to be only slightly roughened, to have gloss, and to be excellent in contrast and sharpness.

Example 4

Example 4 is concerned with a rear projection screen of the above-described first embodiment, in which both of the lens sheets on the light source side and on the observation side are made smooth by means of coating.

Namely, in Example 4, a rear projection screen was made by the combination use of a Fresnel lens sheet (surface roughness Ra=0.44 micrometers) having a thickness of 2 mm, produced by a press molding method, using a metal mold whose surface had been roughened (surface roughness Ra=0.45 micrometers) by a blast treatment so as to obtain a Fresnel lens surface, and a lenticular lens sheet (lens pitch 0.75 mm) having a thickness of 1 mm, produced by means of extrusion molding. The Fresnel lens sheet was made from an anti-shock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers, and the surface of the Fresnel lens sheet obtained was made smooth by coating thereto an acrylic transparent resin (surface roughness Ra=0.15 micrometers). The lenticular lens sheet was made from an anti-shock type polymethyl methacrylate resin (manufactured by Sumitomo Chemical Co., Ltd., refractive index n=1.51) containing 2.0 parts by weight of glass beads having a refractive index n of 1.53, and a mean particle diameter of 13 micrometers, and the surface of the lenticular lens sheet obtained was made smooth by coating thereto an acrylic transparent resin (surface roughness Ra=0.35 micrometers).

An image was projected on the thus-produced rear projection screen by using an LCD projector, and evaluated. As a result, the image was observed to be free from roughening, to be very excellent in gloss, and to have high contrast and sharpness.

Example 5

Example 5 is concerned with a rear projection screen of the above-described first embodiment, in which both of the lens sheets on the light source side and on the observation side are made smooth (the lens sheet on the light source side being made smooth without providing thereon a coating, and the lens sheet on the observation side being made smooth by means of coating), and the refractive index of the coating material used for the lens sheet on the observation side is lower that of the base material of the lens sheet.

Namely, in Example 5, a rear projection screen was made by the combination use of a Fresnel lens sheet (surface roughness Ra=0.20 micrometers) having a thickness of 2 mm, produced by means of press molding, and a lenticular lens sheet (lens pitch 0.75 mm) having a thickness of 1 mm, produced by means of extrusion molding. The Fresnel lens sheet was made from an anti-shock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers. The lenticular lens sheet was made from an anti-shock type polymethyl methacrylate resin (manufactured by Sumitomo Chemical Co., Ltd., refractive index n=1.51) containing 2.0 parts by weight of g ass beads having a refractive index n of 1.53, and a mean particle diameter of 13 micrometers, and the surface of the lenticular lens sheet obtained was made smooth by coating thereto a fluorine-containing transparent resin ("CYTOP" manufactured by Asahi Glass Co., Ltd., Japan, refractive index n=1.34) so that the thickness d of the resin layer would be 11 micrometers (surface roughness Ra=0.37 micrometers).

An image was projected on the thus-produced rear projection screen by using an LCD projector, and evaluated. As a result, the image was observed to be free from roughening, to have gloss, and to be very excellent in contrast and sharpness.

Example 6

Example 6 is concerned with a rear projection screen of the above-described first embodiment, in which both of the lens sheets on the light source side and on the observation side are made smooth (the lens sheet on the light source side being made smooth without providing thereon a coating, and the lens sheet on the observation side being made smooth by providing thereon a coating), and the thickness d of the coating layer of a low-refractive-index material formed on the lens sheet on the observation side is so adjusted that it can fulfill the equation $d=\lambda/4n$ (n: the refractive index of the low-refractive-index material, $\lambda$: theoretical design wavelength).

Namely, in Example 6, a rear projection screen was made by the combination use of a Fresnel lens sheet (surface roughness Ra=0.20 micrometers) having a thickness of 2 mm, produced by means of press molding, and a lenticular lens sheet (lens pitch 0.75 mm) having a thickness of 1 mm, produced by means of extrusion molding. The Fresnel lens sheet was made from an anti-shock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers. The lenticular lens sheet was made from an anti-shock type polymethyl methacrylate resin (manufactured by Sumitomo Chemical Co., Ltd., refractive index n=1.51) containing 2.0 parts by weight of glass beads having a refractive index n of 1.53, and a mean particle diameter of 13 micrometers, and the surface of the lenticular lens sheet obtained was made smooth by coating thereto a fluorine-containing transparent resin ("CYTOP" manufactured by Asahi Glass Co., Ltd., Japan, refractive index n=1.34) so that the thickness d of the resin layer would be $d=\lambda/4n=103$ nm (where the theoretical design wavelength $\lambda$ is 550 nm) (surface roughness Ra=0.38 micrometers).

An image was projected on the thus-produced rear projection screen by using an LCD projector, and evaluated. As a result, the image was observed to be free from roughening, to have gloss, and to be extremely excellent in contrast and sharpness.

Example 7

Example 7 is concerned with a rear projection screen of the above-described first embodiment, in which both of the lens sheets on the light source side and on the observation side are made smooth (the lens sheet on the light source side being made smooth without providing thereon a coating, and the lens sheet on the observation side being made smooth by providing thereon a coating), and the hardness of the coating material used for the lens sheet on the observation side is higher than that of the base material of the lens sheet.

Namely, in Example 7, a rear projection screen was made by the combination use of a Fresnel lens sheet (surface roughness Ra=0.25 micrometers) having a thickness of 2 mm, produced by means of press molding, and a lenticular lens sheet (lens pitch 0.75 mm) having a thickness of 1 mm, produced by means of extrusion molding. The Fresnel lens sheet was made from an anti-shock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers. The lenticular lens sheet was made from an anti-shock type polymethyl methacrylate resin (manufactured by Sumitomo Chemical Co., Ltd., refractive index n=1.51) containing 2.0 parts by weight of glass beads having a refractive index n of 1.53, and a mean particle diameter of 13 micrometers, and the surface of the lenticular lens sheet obtained was made smooth by coating thereto a UV-curable hard-coating material, followed by UV curing (surface roughness Ra=0.35 micrometers).

An image was projected on the thus-produced rear projection screen by using an LCD projector, and evaluated. As a result, the image was observed to be free from roughening, to be very excellent in gloss, and to have high contrast and sharpness. Further, the surface of this screen was found to have a hardness of 2H, and confirmed to have improved scratch resistance.

Comparative Example 1

Comparative Examples for the above-described Examples 1 to 7 will be given below.

In Comparative Example 1, a rear projection screen was made by the combination use of a Fresnel lens sheet (surface roughness Ra=0.25 micrometers) having a thickness of 2 mm, produced by means of press molding, and a lenticular lens sheet (lens pitch 0.75 mm, surface roughness Ra=0.54 micrometers) having a thickness of 1 mm, produced by means of extrusion molding. The Fresnel lens sheet was made from an anti-shock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers. The lenticular lens sheet was made from an anti-shock type polymethyl methacrylate resin (manufactured by Sumitomo Chemical Co., Ltd., refractive index n=1.51) containing 1.8 parts by weight of glass beads having a refractive index n of 1.53, and a mean particle diameter of 13 micrometers.

An image was projected on the thus-produced rear projection screen by using an LCD projector, and evaluated. As a result, the image was observed to be roughened, to have no gloss, and to be poor in contrast and insufficient in sharpness.

Comparative Example 2

In Comparative Example 2, a rear projection screen was made by the combination use of a Fresnel lens sheet (surface roughness Ra=0.44 micrometers) having a thickness of 2 mm, produced by a press molding method, using a metal mold whose surface had been roughened (surface roughness Ra =0.45 micrometers) by a blast treatment so as to obtain a Fresnel lens surface, and a lenticular lens sheet (lens pitch 0.75 mm, surface roughness Ra=0.56 micrometers) having a thickness of 1 mm, produced by means of extrusion molding. The Fresnel lens sheet was made from an anti-stock type polymethyl methacrylate resin (manufactured by Sumitomo Chemical Co., Ltd., refractive index n=1.51) containing 0.4 parts by weight of styrene beads having a refractive index n of 1.59, and a mean particle diameter of 11 micrometers. The lenticular lens sheet was made from an anti-shock type polymethyl methacrylate resin (manufactured by Sumitomo Chemical Co., Ltd., refractive index n=1.51) containing 1.8 parts by weight of glass beads having a refractive index n of 1.53, and a mean particle diameter of 13 micrometers.

An image was projected on the thus-produced rear projection screen by using an LCD projector, and evaluated. As a result, the image was observed to be considerably roughened, to have no gloss, and to be poor in contrast and insufficient in sharpness.

What is claimed is:

1. A rear projection screen used for projecting very clear and distinct images comprising
    an optical sheet including a diffusing material and having fine irregularities caused by said diffusing material on a light-emerging-side surface of said optical sheet; and
    a transparent coating layer provided on at least an imaging-light-transmitting area in the light-emerging side surface of said optical sheet,
    wherein said transparent coating layer smooths the imaging-light-transmitting area in the light-emerging-side surface of said optical sheet so that a surface roughness Ra of the imaging-light-transmitting area of said optical sheet is 0 to 40 $\mu$m.

2. The rear projection screen according to claim 1, wherein the coating layer is a layer whose thickness d fulfills the equation d=$\lambda$/4n, where n is a refractive index of the coating layer, d is the thickness, and $\lambda$ is a theoretical design wavelength.

3. The rear projection screen according to claim 1, wherein the coating layer has a hardness that is higher than that of the optical sheet.

4. The rear projection screen according to claim 1, further comprising a light-shielding layer provided on the light-emerging-side surface of the optical sheet, excluding the surface of the imaging-light-transmitting area.

5. The rear projection screen according to claim 4, further comprising a transparent coating layer con the light-shielding layer.

6. The rear projection screen according to claim 1, wherein said coating layer has a refractive index that is lower than the refractive index of said optical sheet.

7. The rear projection screen according to claim 1, wherein said images are projected from a single-tube-light source.

8. A rear projection screen used for projecting very clear and distinct images comprising
    a plurality of optical sheets, at least the outermost optical sheet of said optical sheets including a diffusing material and having fine irregularities caused by said diffusing material on a light-emerging-side surface of said optical sheet; and
    a transparent coating layer provided on at least an imaging-light-transmitting area in the light-emerging-side surface of at least the outermost optical sheet[, said transparent coating layer having a refractive index that is lower than the refractive index of the outermost optical sheet],
    wherein said transparent coating layer smooths the imaging-light-transmitting area of the outermost optical sheet so that a surface roughness Ra of the imaging-light-transmitting area of the outermost optical sheet is from 0 to 0.40 $\mu$m.

9. The rear projection screen according to claim 8, wherein the coating layer is a layer whose thickness d fulfills the equation d=$\lambda$/4n, where n is a refractive index of the coating layer, d is the thickness, and $\lambda$ is a theoretical design wavelength.

10. The rear projection screen according to claim 8, wherein the coating layer has a hardness that is higher than that of the outermost optical sheet.

11. The rear projection screen according to claim 8, further comprising a light-shielding layer provided on the light-emerging-side surface of at least the outermost optical sheet, excluding the surface of the imaging-light-transmitting area.

12. The rear projection screen according to claim 11, further comprising a transparent coating layer on the light-shielding layer.

13. The rear projection screen according to claim 8, wherein said coating layer has a refractive index that is lower than the refractive index of said optical sheet.

14. The rear projection screen according to claim 8, wherein said images are projected from a single-tube-light source.

* * * * *

UNITED STATES PATENT AND TRADEMARK OFFICE
CERTIFICATE OF CORRECTION

PATENT NO.     : 6,295,162 B1
DATED          : September 25, 2001
INVENTOR(S)    : Hideki Miyata It is certified that error appears in the above-identified patent and that said Letters Patent is hereby corrected as shown below:

<u>Column 12,</u>
Line 2, change "40" to -- 0.40 --.
Line 15, change "con" to -- on --.
Line 32, delete ", said";
Lines 33 to 35, delete in their entirety.

Signed and Sealed this

Seventh Day of January, 2003

JAMES E. ROGAN
*Director of the United States Patent and Trademark Office*